Oct. 27, 1970 M. A. RICH 3,537,038

TRANSVERSAL-FILTER EQUALIZATION CIRCUITS

Filed June 28, 1968 4 Sheets-Sheet 1

INVENTOR
M. A. RICH
BY Leo Stanger
ATTORNEY

3,537,038
TRANSVERSAL-FILTER EQUALIZATION CIRCUITS

Marc A. Rich, Long Branch, N.J., assignor to Bell Telephone Laboratories, Incorporated, Murray Hill, N.J., a corporation of New York Filed June 28, 1968, Ser. No. 740,951
Int. Cl. H04b 3/04
U.S. Cl. 333—18 12 Claims

ABSTRACT OF THE DISCLOSURE

A control circuit forms correction voltages to adjust the tap gains of a transversal filter. It does this by delaying those of the filter's output waveforms that arise from a set of successive equal and opposite synchronizing pulses, and then adding each delayed waveform to the subsequent output waveform. Successive binary correction voltages representing the polarities of the added waveforms of one set of synchronizing pulses are averaged with corresponding correction voltage in subsequent sets of waveforms formed by other sets of synchronizing pulses. Successive averaged correction voltages each adjust different tap gains incrementally. Corrections repeatedly made on the basis of these averaged voltages cause the correction process to converge and achieve minimum distortion.

BACKGROUND OF THE INVENTION

This invention relates to transversal filters as well as systems employing such filters, and particularly to circuits for adaptively adjusting the tap gains that determine the characteristics of a transversal filter.

Transversal filters serve as equalizers for eliminating or minimizing the amplitude and phase distortions that a transmission system imposes on data pulses or other informtion signals as they pass from a sending point to a receiver. Transversal filters perform their functions by delaying distorted waveforms in a delay line so as to establish successive time displaced images of the input waveform at taps along the delay line, and by then adding predetermined portions of these time displaced images. Separate multipliers at the taps vary the respective tap gains, that is the respective polarity and proportions of the images assembled. The proper setting of such multipliers presents a problem.

In an article entitled "Automatic Equalization for Digital Communication" in the April 1965 Bell System Technical Journal, p. 547 et seq., published by the American Telephone and Telegraph Company, R. W. Lucky discloses a system for establishing respective partial correction voltages for adjusting each multiplier so as to achieve minimum distortion. In the Lucky system single isolated test pulses are transmitted periodically between the data pulses. Each test pulse is time spaced from preceding and subsequent data pulses by predetermined spacer periods. Lucky then derives the polarities of samples taken from the distorted output voltages at intervals corresponding to the tap intervals and occurring before and after the test pulse output. Lucky shows that if the polarity of each output sample is used as a binary correction voltage for incrementally adjusting the gain of a corresponding multiplier the correction must converge within a specific error and the overall distortion be minimized. According to this aspect of Lucky's disclosure Lucky assumes the often encountered initial condition that the systems's distortion is low enough so that the system is already capable of supporting binary transmission without error in the absence of noise. His equalizer thus improves the system so as to render it capable of supporting multilevel pulse data transmission. This system is also disclosed in U.S. Pat. No. 3,292,110.

While such a system performs its function it imposes upon the transmitter the need to furnish a time space in the data for isolated single pulses. This limits the time available for information signals. Exacerbating this difficulty is the need to furnish sets of successive "dedicated" synchronizing pulses that serve such purposes as generating clock pulses or for establishing direct voltage levels.

A further article by R. W. Lucky in February 1966 Bell System Technical Journal, p. 255 et seq., discloses a system for establishing the previously mentioned correction voltages by estamating these values from the data pulses. This requires extensive equipment for making the estimate and the accuracy of the estimates decrease with increasing distortion. This system is shown in U.S. Pat. No. 3,368,168.

THE INVENTION

According to a feature of the invention correction voltages for incrementally adjusting the tap gains of a transversal filter are obtained in groups. Each group is formed by combining, such as by adding, those of the filter's output waveforms that arise from a set of so-called dedicated pulses with the subsequent waveform arising from the set, and then sampling the combined waveforms at given intervals. Different tap gains are repeatedly adjusted on the basis of respective ones of the correction voltages in each group.

According to another feature of the invention, the sampling is done when dedicated pulses appear at the filter output; namely, at each pulse interval after the first dedicated pulse in each set. According to still another feature only samples of polarity are taken.

According to another feature of the invention, gate distributing means such as a shift register distribute the successive correction voltage of a group to separate multipliers.

According to still another feature of the invention, plural up-down counters associated with the outputs of the shift register average the respective ones of the correction voltages in different groups.

The invention is based upon recognition that by delaying th output waveforms arising from each of the dedicated pulses in a set, and combining them with successive waveforms arising from the set, voltages are produced which correspond closely to the voltages sampled by Lucky. Thus, despite the dedicated pulses being so closely spaced as to be subject to intersymbol interference, and without the need for additional time spacing to furnish isolated pulses, the sampled voltages available to Lucky are furnished.

These and other features of the invention are pointed out in the claims. Other objects and advantages of the invention will become obvious from the following detailed description when read in light of the accompanying drawings.

DESCRIPTION OF PREFERRED EMBODIMENT

Figure 1:
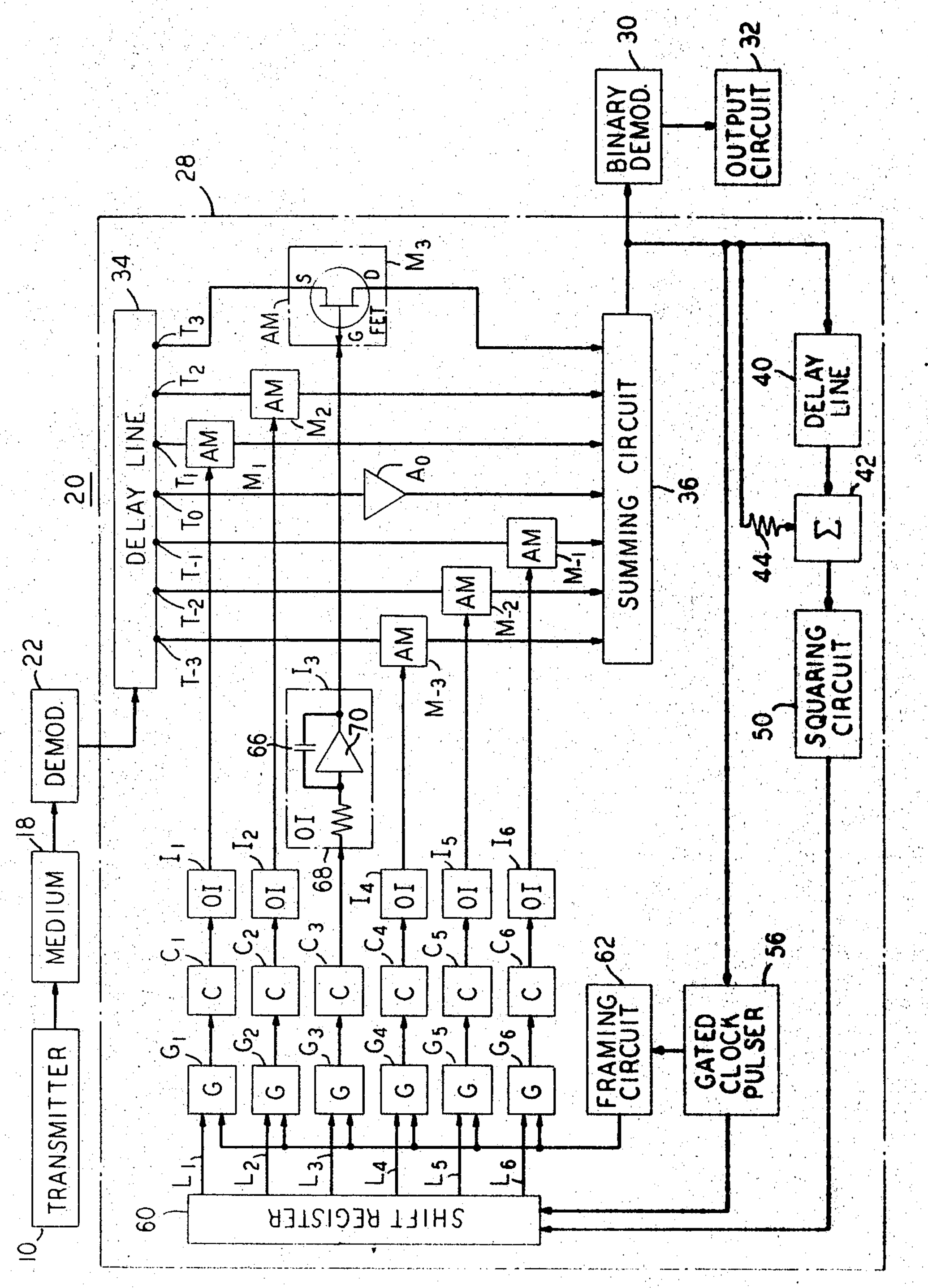
FIG. 1 is a block diagram illustrating a transmission system embodying features of the invention.
Figure 2:
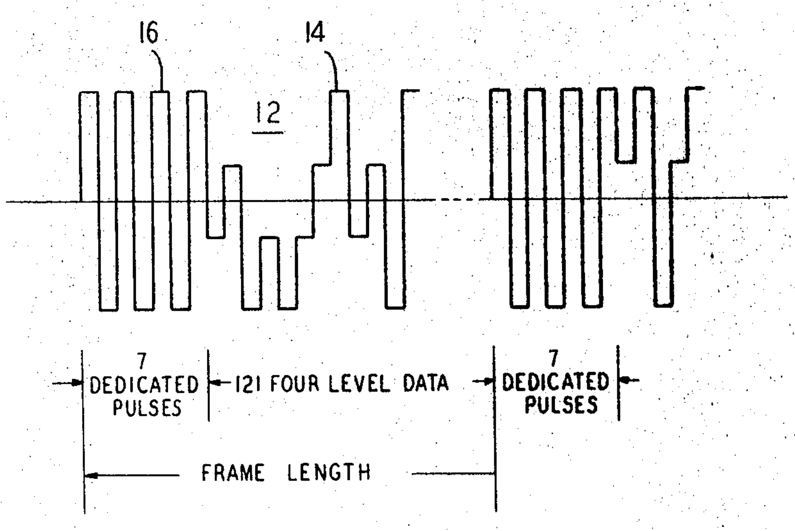
FIG. 2 is a voltage-time graph illustrating idealized forms of signals being transmitted by a transmitter in FIG. 1.

In FIG. 1 a transmitter 10 generates a carrier signal modulated by a baseband signal 12, an idealized example of which appears in FIG. 2. The baseband signal 12 is composed of a continuous pulse stream, in which every one hundred twenty-eight pulses forms a frame. Each frame includes one hundred twenty-one adjacent 4-level data pulses 14 and a set of seven "dedicated" binary pulses 16. The dedicated pulses serve as synchronizing pulses, timing pulses, and to establish DC levels at the receiving apparatus. In each of the frames the seven dedicated pulses are identical. They include four positive going pulses alternating with three negative going pulses.

Figure 3:
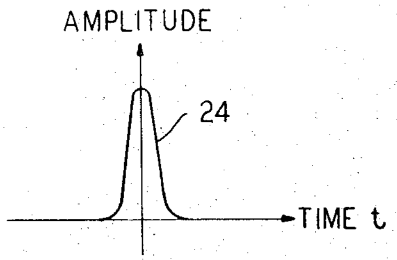
FIG. 3 is an amplitude-time graph illustrating a single pulse which may be transmitted by the transmitter in FIG. 1.
Figure 4:
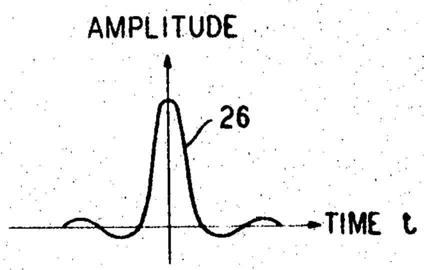
FIG. 4 is an amplitude-time graph illustrating the appearance of the pulse of FIG. 3 after it has been distorted by the transmission medium of FIG. 1.
Figures 5A, 5B, 5C, 5D, 5E, 5F, 5G:
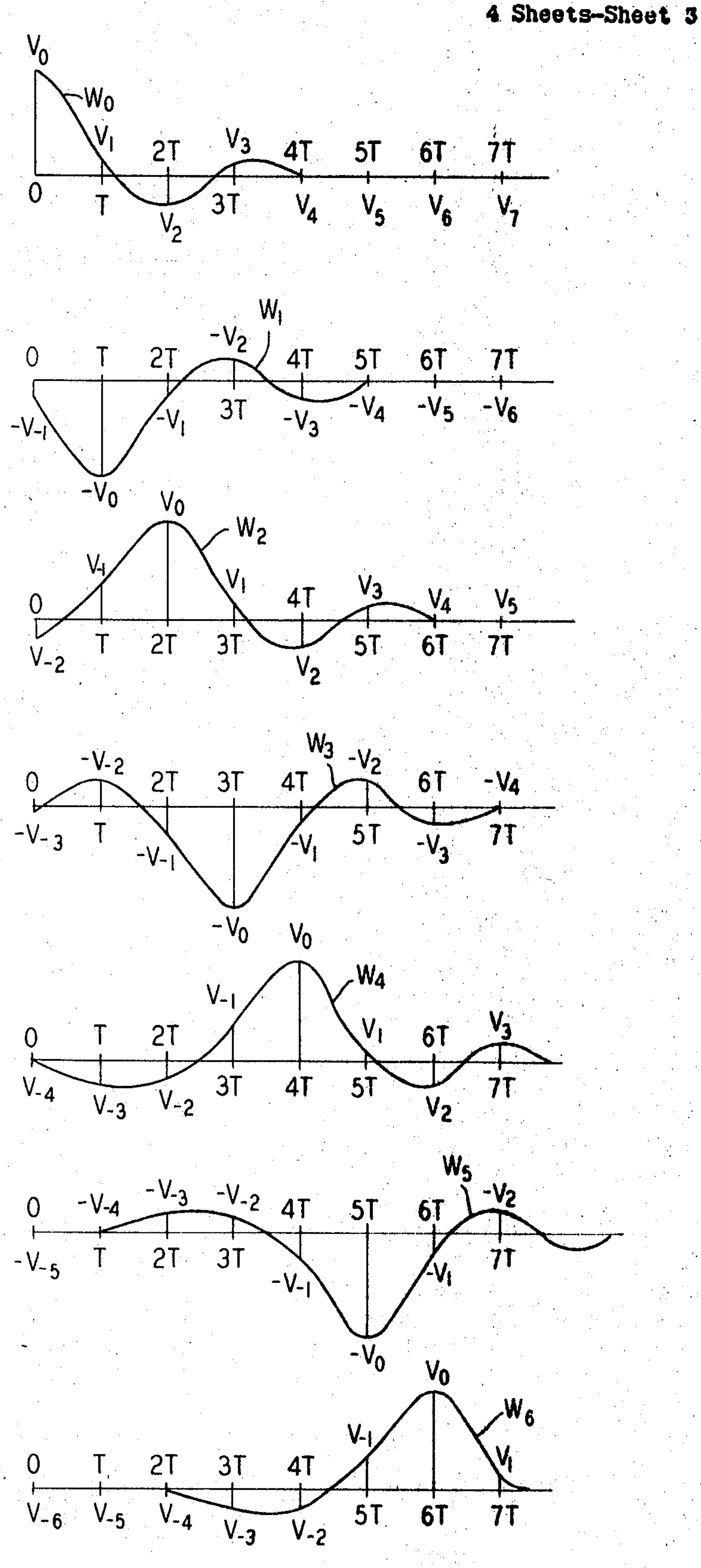
FIGS. 5*a* to 5*g* are amplitude-time graphs illustrating successive individual pulses considered alone appearing at the output of the filter in FIG. 1 before the filter has been adjusted.

In FIG. 1, a transmission medium 18 carries the thus modulated signals to a receiver 20. There a demodulator 22 extracts the baseband signal from the carrier before applying the former to the remainder of the receiver. Together the medium 18 and the demodulator 22 impose both amplitude and phase distortion upon the transmitted signal so that an individual transmitted pulse 24 such as shown in FIG. 3 may appear, when demodulated, like the pulse 26 in FIG. 4. Such a distorted pulse may vary the shapes of similarly distorted preceding and succeeding pulses and have its shape varied by them. However, in accordance with transmitting the conditions most usually encountered in practice the medium and demodulator as well as any other distortion producing means in FIG. 1, impose sufficiently low distortion upon the signals so that the system is capable of supporting binary transmission without error in the absence of noise. Nevertheless the distortion of the 4-level pulses 14 is sufficiently great to make them substantially unrecognizable without equalization.

In FIG. 1 a transversal filter 28 serves as an equalizer to restore the pulses 14 distorted by the transmission medium 18 and the demodulator 22. A binary demodulator 30 converts the resulting 4-level pulse signals to binary signals and passes them to an output circuit 32.

The transversal filter 28 transforms the input waveforms from the demodulator 22 by delaying them in a delay line 34. The latter establishes successive time displaced images of the distorted input waveforms at taps $T_{-3}$, $T_{-2}$, $T_{-1}$, $T_0$, $T_1$, $T_2$, and $T_3$ spaced one pulse, or band, interval apart along the delay line. Adjustable multipliers $M_{-3}$, $M_{-2}$, $M_{-1}$, $M_1$, $M_2$, and $M_3$ vary the polarities and proportions the time displaced images at the taps $T_{-3}$, $T_{-2}$, $T_{-1}$, $T_1$, $T_2$, and $T_3$ and apply them together to a summing circuit 36. As shown, the multiplier $M_3$ is composed of a field effect transistor FET arranged to multiply the signal linearly at variable levels, between +1 and −1. The remaining multipliers are similarly constituted. The signals appearing at the tap $T_0$ are passed without adjustment by an amplifier $A_0$ to the summing circuit 36. Ideally, the multipliers are adjusted so that the filter 28 exhibits a transfer function that transforms a distorted baseband signal appearing at the output of the demodulator 22 to its original undistored form. The output of the summing circuit 36 constitutes the output of the filter 28. It is passed to the binary demodulator 30 and the output circuit 32.

If the multipliers $M_{-3}$ to $M_3$ are out of adjustment successive individual ones of the dedicated pulses 16, when considered alone, produce output waveforms $W_0$, $W_1$, $W_2$, $W_3$, $W_4$, $W_5$, $W_6$ at the summing circuit as shown in FIGS. 5*a*, 5*b*, 5*c*, 5*d*, 5*e*, 5*f* and 5*g*, respectively. Since successive dedicated pulses are equal and opposite and displaced from each other by one band interval, the waveforms $W_0$ to $W_6$ are also equal and altenately opposite and displaced from each other by one band interval.

The waveforms $W_0$ to $W_6$, each considered alone, exhibit voltages $v_n$ or $-v_n$ (where $n$ equals integers $-m \ldots 0 \ldots m$) at pulse intervals $n$T before and after the peak voltage $v_0$ or $-v_0$ of each waveform. These voltages $V_n$ or $-V_n$ of one of the waveforms constitute the voltages whose polarities are sampled to form incremental correction potentials in the before-mentioned R. W. Lucky article dated April 1965. As shown by Lucky, when binary signals representing the polarities of the separate voltages $v_{-3}$, $v_{-2}$, $v_{-1}$, $v_1$, $v_2$ and $v_3$ are used repeatedly to reset the condition of the corresponding multipliers $M_{-3}$, $M_{-2}$, $M_{-1}$, $M_1$, $M_2$, and $M_3$ the process converges to produce minimum distortion.

According to the invention a similar result is achieved. Here in FIG. 1 a delay line 40 delays the output waveforms from the summing circuit 36 one band or pulse interval. A summing circuit 42 combines the delayed waveform with the succeeding waveform that a resistor 44 attenuates to the level of the delayed waveform to form correction voltages. Examples of voltages which appear at the output of the summing circuit 36 are shown as waveform 46 in FIG. 6. An example of a voltage waveform 48 appearing at the output of the summing circuit 42 and resulting from the waveform 46 appears in FIG. 7. A "slicer" or squaring circuit 50 steps the waveform at each zero crossover point to form the waveform 54 in FIG. 8. Each time the waveform 48 exceeds a slight positive threshold level there is an abrupt transition to a stable positive step voltage. Each time the waveform 48 drops below a slight negative threshold an abrupt transition to a stable negative step voltage occurs. The squaring circuit is preferably composed of a comparator, an amplifying clipper such as an emitter-coupled transistor clipper, or a Schmitt trigger, all of which are described in "Pulse, Digital and Switching Waveforms," by Millman and Taub, published in 1965 by McGraw-Hill, Incorporated.

Figures 6, 7, 8, 9, 10A, 10B, 10C, 10D, 10E, 10F, 11:
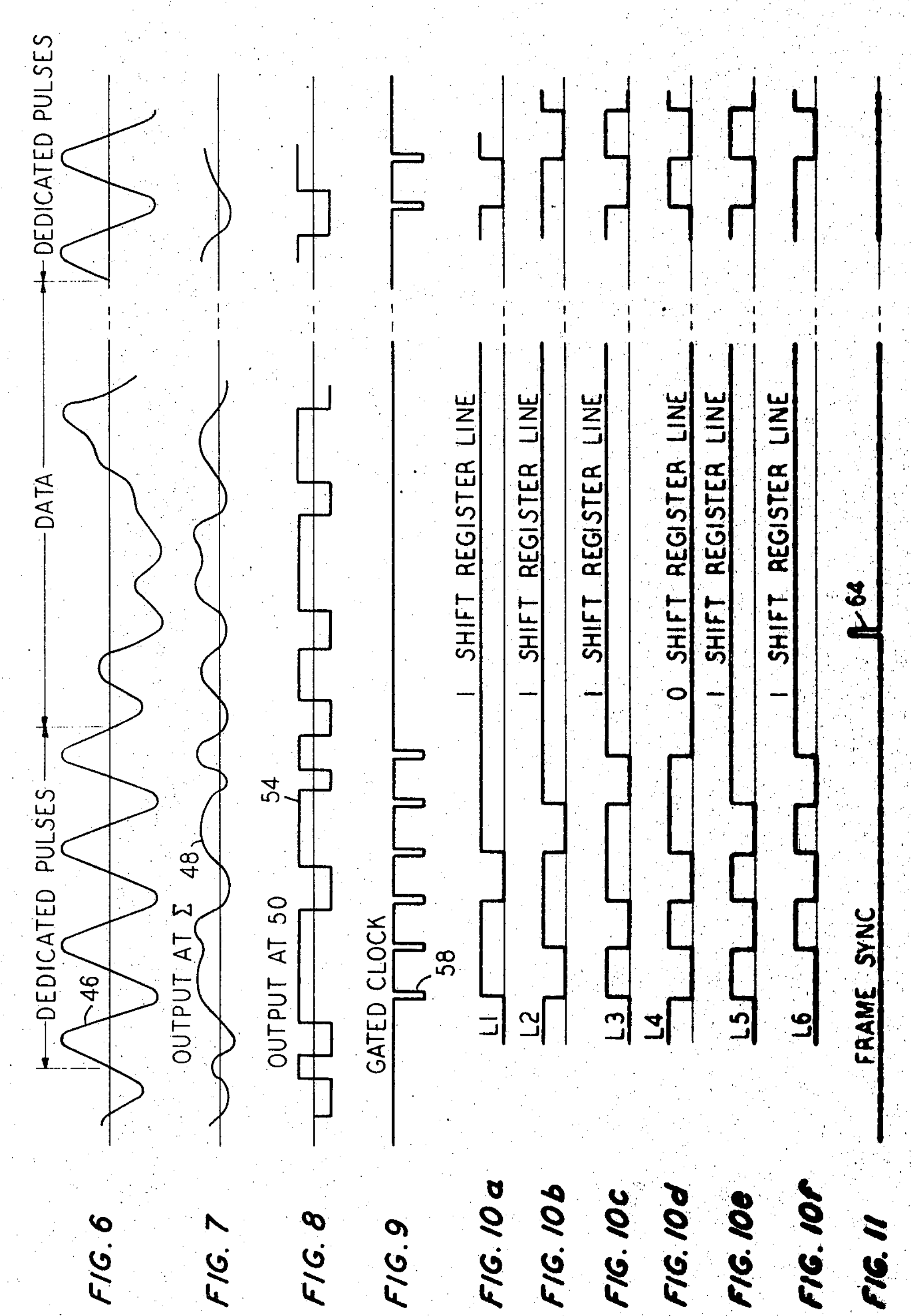
FIGS. 6 to 9 are voltage-time graphs illustrating respectively the transversal filter output voltages, the correction voltages formed by adding output waveforms, the correction voltages after squaring, and clock pulses, respectively, all formed by the portions of the circuit in FIG. 1.
FIGS. 10*a* to 10*f* are voltage-time diagrams illustrating the respective outputs of a shift register in FIG. 1.
FIG. 11 is a voltage-time diagram illustrating the output of a framing circuit in FIG. 1.

A gated clock pulser 56 responding to the output of the summing circuit 36 to produce pulses 58 such as shown in FIG. 9 that coincide with the peaks of the second to seventh dedicated pulses. The pulses 58 from the clock pulser 56 toggle a shift register 60 to which the output waveforms 54 of the squaring circuit 50 are applied. Thus at each pulse 58 the voltage of the waveform 54 appearing at the squaring circuit 50 is entered into the first stage of the shift register 60. At each succeeding clock pulse 58 the signals are shifted along to the following stages. The voltage variations appearing at the successive output lines $L_1$, $L_2$, $L_3$, $L_4$, $L_5$, and $L_6$ of the shift-register stages are shown in FIGS. 10*a*, 10*b*, 10*c*, 10*d*, 10*e*, and 10*f*, respectively.

At the end of the sixth pulse 58 the voltage which appeared first at the output of squaring circuit 50 has been shifted to the line $L_1$. Similarly the voltage appearing at the output of amplifier 52 at the last pulse 58 in the set of six pulses is then established at the line $L_6$. The intervening potentials have also been shifted along the lines of the shift register as the gated clock pulser toggles the shift register. As can be seen from FIGS. 10*a* through 10*f* the logic signals appearing at the outputs' lines $L_1$ through $L_6$ correspond to the voltages occurring at the squaring circuit during the first to last pulses 58. That is to say, if the waveform 54 during the clock pulses 58 can be said to exhibit outputs 1, 1, 0, 1, 1, 1, the logic potentials appearing at the lines $L_1$ through $L_6$ are also 1, 1, 0, 1, 1, 1.

Six gates $G_1$ through $G_6$ block the potentials appearing at the output lines of the shift register until the gated clock pulser 56 causes a framing circuit 62 to admit a pulse 64 as shown in FIG. 11 that opens the gates $G_1$ through $G_6$. Then the voltages appearing at the lines $L_1$ through $L_6$ are applied to respective up-down counters $C_1$ through $C_6$. The counters $C_1$ through $C_6$ count up for each signal 1 and count down for each signal 0. The counters $C_1$ through $C_6$ are five stage binary counters so that when thirty-two pulses have accumulated they apply respective current pulses to respective substantially identical operational integrators $I_1$ through $I_6$. An example of details of the operational integrators is shown for the operational integrator $I_3$. Operational integrators are also described in "Pulse Digital and Switching Waveforms" by Millman and Taub, published by the McGraw-Hill Book Company in 1965.

In the operational integrator $I_3$ the current pulse is applied to add or subtract charge across a capacitor 66 through a resistor 68. The capacitor 66 is connected across the input and output of an amplifier. The output of the integrators $I_1$ through $I_6$ correspond to the voltages across their respective capacitors 66.

The operational integrators $I_1$ through $I_6$ apply their outputs to vary the gains of the multipliers $M_{-1}$, $M_{-2}$, $M_{-3}$, $M_3$, $M_2$, and $M_1$. As shown for the operational integrator $I_3$ and the multiplier $M_3$ the voltage from the integrator is applied to the gate of a field effect transistor that serves as a variolosser. The signal input of the field effect transistor comes from the tap $T_3$ and appears at the source S. The gate of the field effect transistor varies with the voltage across the capacitor 66. The output of the field effect transistor FET appears at its drain D and is applied to the summing circuit 36. The remaining multipliers operate similarly. As a result, the proportions of the signals from the delay line taps $T_{-3}$ to $T_3$ vary according to the charge across the capacitors 66 of the operational integrators $I_1$ through $I_6$.

In operation the transmitter 10 of FIG. 1 sends the baseband pulse format corresponding to that of FIG. 2 through the transmission medium 18. The demodulator 22 demodulates it and passes it to the delay line 34. The summing circuit 36 by collecting discrete proportions of the successive time displaced images of the input waveform at equally spaced locations along the delay line 34 produces an output waveform 46 as shown in FIG. 6. Since the larger proportion is taken from the tap $T_0$ the peaks of the pulses in FIG. 6 belonging to the dedicated pulses coincide with those at the tap $T_0$.

At any one time $t=0$, T, 2T, 3T, 4T, 5T, or 6T as measured from the time the peak of the first dedicated pulse appears at the tap $T_0$ the output at the summing circuit 36 is the sum of all the voltages $v_n$ (where $n=-m \ldots 0 \ldots m$) in FIGS. *5a* through *5g* occurring at that time. Thus the total output voltages $V_0$ at the time $t=0$ is the sum of all output voltages in FIGS. *5a* to *5g* at time $t=0$. The output voltages $V_1$, $V_2$, $V_3$, $V_4$, $V_5$, and $V_6$ are each the sums of all the output voltages at respective times T, 2T, 3T, 4T, 5T, and 6T. Thus assuming the data pulses to be absent or to have substantially no effect upon these voltages at time $t=0$ the total output voltage.

$$V_0=v_0-v_{-1}+v_{-2}-v_{-3}+v_{-4}-v_{-5}+v_{-6}$$

At $t=T$, $$V_1=v_1-v_0+v_{-1}-v_{-2}+v_{-3}-v_{-4}+v_{-5}$$

At $t=2T$, $$V_2=v_2-v_1+v_0-v_{-1}+v_{-2}-v_{-3}+v_{-4}$$

At $t=3T$, $$V_3=v_3-v_2+v_1-v_0+v_{-1}-v_{-2}+v_{-3}$$

At $t=4T$, $$V_4=v_4-v_3+v_2-v_1+v_0-v_{-1}+v_{-2}$$

At $t=5T$, $$V_5=v_5-v_4+v_3-v_2+v_1-v_0+v_{-1}$$

At $t=6T$, $$V_6=v_6-v_5+v_4-v_3+v_2-v_1+v_0$$

When two successive outputs at summing circuit 36 are added in the summing circuit 42 the resulting potential $$E_1=V_1+V_0=v_1+v_{-6}$$

Similarly, $$E_2=V_2+V_1=v_2+v_{-5}$$

$$E_3=V_3+V_2=v_3+v_{-4}$$

$$E_{-3}=V_4+V_3=v_4+v_{-3}$$

$$E_{-2}=V_5+V_4=v_5+v_{-2}$$

$$E_{-1}=V_6+V_5=v_6+v_{-1}$$

If the distortion is confined within three pulse intervals on either side of center of the pulse response, that is if $v_{-4}, v_{-5}, v_{-6} \ldots$ and $v_4, v_5, v_6 \ldots$ are all effectively zero then $$E_1=v_1$$

$$E_2=v_2$$

$$E_3=v_3$$

$$E_{-3}=v_{-3}$$

$$E_{-2}=v_{-2}$$

$$E_{-1}=v_{-1}$$

Thus, the output of the summation circuit 42 corresponds to the sample voltages whose polarities are used by Lucky to increamentally correct respective multipliers. This distribution of the separate pulses to the different multipliers is accomplished by the shift register 60 so that when the framing circuit 62 opens the gates $G_1$ through $G_6$ separate multipliers are adjusted on the basis of separate ones of the voltages.

The counters $C_1$ through $C_6$ do not permit the voltages directly to affect the multipliers. In effect the counter $C_1$ averages the first correction voltage of one group, formed from one set of dedicated pulses, with the first correction voltages of other groups of correction voltages. Similarly the counters $C_2$ through $C_6$ average the second to sixth correction voltages with the second to sixth correction voltages of other groups. This averaging is necessary because data pulses immediately precede and follow the dedicated pulses. The interference between the dedicated pulses and the data pulses which can be expected produces perturbation of the values $E_1$, $E_2$, $E_3$, $E_{-3}$, $E_{-2}$, and $E_{-1}$. The counters $C_1$ through $C_6$ take advantage of the fact that data pulses are random. Thus over a long term period the average value of perturbation is zero. As shown by the beforementioned April 1965 Bell System Technical Journal article the partial corrections of the respective multipliers $M_{-3}$, $M_{-2}$, $M_{-1}$, $M_1$, $M_2$, and $M_3$ when combined with additional partial corrections in response to new sets of seven dedicated equalized pulses allow the distortion to be minimized.

Each time the multipliers are adjusted, the output at summing circuit 36 is partially corrected. Thus subsequent sets of equalized dedicated pulses appearing at the output of circuit 36 form new estimated corrections. This process of correction converges until minimum distortion is achieved.

In order to prevent information signals from being lost the multipliers may be set initially during a "training" period when the transmitter 10 sends only the dedicated pulses the system rapidly adjusts the system for minimum distortion. It continues to maintain the adjustment during normal transmission.

By taking the polarities of the sum voltage 48 at sampling times set by the pulses 58, the potentials appearing at the capacitors 66 across the amplifiers 70 in the integrators $I_1$ to $I_6$ may be varied to reset the multipliers $M_{-3}$ to $M_3$ for minimum distortion.

While an embodiment of the invention has been described in detail it will be obvious to those skilled in the art that the invention may be embodied otherwise without departing from its spirit and scope.

What is claimed is:

1. An equalizer, comprising transversal filter means, a plurality of adjustable multiplier means in said filter means for varying the characteristics of said filter means, circuit means connected to said transversal filter means for combining output signals from said transversal filter means with subsequent output signals from said filter means to form successive correction potentials, control means connected to said circuit means and said multiplier means for adjusting different ones of said adjustable multiplier means on the basis of different predetermined ones of said correction potentials.

2. An equalizer as in claim 1 wherein, said circuit means include delay means connected to said transversal means for delaying output signals from transversal filter means and combining means connected to said delay means and said transversal filter means for combining the waveform output of said delay means with the subsequent output signals from said filter means.

3. An equalizer as in claim 2 wherein said delay means introduces a delay equal to one pulse period of the waveforms to be equalized.

4. An equalizer as in claim 2 wherein said combining means includes a summing circuit connected to said delay means and an attenuating circuit connected to said transversal filter means, said summing circuit and attenuating circuit being connected to each other.

5. An equalizer as in claim 1 wherein timing menas connected to respond to the output of said transversal filter means regulate the control means for selecting the predetermined ones of said correction potentials.

6. An equalizer as in claim 1 wherein said control means include shift register means having a plurality of output lines for establishing successive ones of said correction potentials at different ones of said output lines, and coupling means for connecting the voltages at said output line to separate ones of said multiplier means.

7. An equalizer as in claim 5 wherein said coupling means include voltage averaging means for averaging the group of voltages appearing at said separate lines over a number of groups of said correction potentials.

8. An equalizer as in claim 6 wherein said averaging means include a plurality of up-down counters.

9. An equalizer as in claim 1 wherein said control means include timing means for selecting different predetermined ones of said correction potentials in groups, and averaging means in said control means and connected to said multiplier means for averaging predetermined ones of said correction potentials in one of said groups with predetermined correction potentials in another of said groups.

10. A transmission system comprising sending means for sending information that includes a plurality of equal clock signals arranged in separate sets, transmission means coupled to said sending means for transmitting the information, transversal filter means coupled to said medium means for equalizing the information and including a plurality of adjustable multiplier means for varying the characteristics of said filter means, output means connected to said transversal filter means, circuit means connected to said transversal filter means for combining output signals from said transversal filter means with subsequent output signals from said filter means to form successive correction potentials, control means connnected to said circuit means and said multiplier means for adjusting different ones of said adjustable multiplier means on the basis of different ones of said correction potentials.

11. A transmission system as in claim 9 wherein sending means generate said sets of synchronizing signals so that they are each composed of equal and opposite adjacent successive pulses.

12. A transmission system as in claim 10 wherein averaging means in said control means and connected to said multiplier means average the successive correction potentials arising from one set with corresponding ones of the correction potentials arising from other sets.

References Cited

UNITED STATES PATENTS

| | | | |
|---|---|---|---|
| 2,805,398 | 9/1957 | Albersheim | 328—163 X |
| 3,292,110 | 12/1966 | Becker et al. | 333—18 |
| 3,368,168 | 2/1968 | Lucky | 333—18 |
| 3,375,473 | 3/1968 | Lucky | 333—18 |
| 3,414,819 | 12/1968 | Lucky | 333—18 X |
| 3,414,845 | 12/1968 | Lucky | 333—18 |
| 3,477,043 | 11/1969 | Farrow | 333—18 |

JOHN S. HEYMAN, Primary Examiner

U.S. Cl. X.R.

178—69; 325—42; 328—163; 333—70